(12) United States Patent
Vo et al.

(10) Patent No.: US 11,295,170 B1
(45) Date of Patent: Apr. 5, 2022

(54) GROUP-EQUIVARIANT CONVOLUTIONAL NEURAL NETWORKS FOR 3D POINT CLOUDS

(71) Applicant: FPT USA Corp., Richardson, TX (US)

(72) Inventors: Thieu Ngoc Vo, Gia Lai (VN); Phong Xuan Nguyen, Ha Noi (VN); Nghia Trung Huynh, Quang Ngai (VN); Binh Cong Phan, Dong Thap (VN); Tuan Anh Le, Ho Chi Minh (VN)

(73) Assignee: FPT USA Corp., Richardson, TX (US)

( * ) Notice: Subject to any disclaimer, the term of this patent is extended or adjusted under 35 U.S.C. 154(b) by 0 days.

(21) Appl. No.: 17/403,888

(22) Filed: Aug. 17, 2021

(51) Int. Cl.
| | |
|---|---|
| *G06K 9/00* | (2006.01) |
| *G06K 9/62* | (2022.01) |
| *G06T 7/33* | (2017.01) |
| *G06T 3/40* | (2006.01) |
| *G06V 10/42* | (2022.01) |

(Continued)

(52) U.S. Cl.
CPC .......... *G06K 9/6256* (2013.01); *G06T 3/4046* (2013.01); *G06T 7/344* (2017.01); *G06V 10/243* (2022.01); *G06V 10/42* (2022.01); *G06V 10/95* (2022.01); *G06T 2207/10024* (2013.01); *G06T 2207/10028* (2013.01); *G06T 2207/20081* (2013.01); *G06T 2207/20084* (2013.01)

(58) Field of Classification Search
CPC ............. G06K 9/6256; G06K 9/00979; G06K 9/3275; G06K 9/52; G06T 7/344; G06T 3/4046; G06T 2207/10024; G06T 2207/10028; G06T 2207/20081; G06T 2207/20084

USPC ......................................................... 382/157
See application file for complete search history.

(56) References Cited

U.S. PATENT DOCUMENTS

| | | | |
|---|---|---|---|
| 9,076,219 B2 | 7/2015 | Cha et al. | 382/173 |
| 9,858,640 B1 | 1/2018 | Earl et al. | 382/154 |

(Continued)

FOREIGN PATENT DOCUMENTS

| | | |
|---|---|---|
| CN | 109034077 A | 12/2018 |
| CN | 110097556 A | 8/2019 |

(Continued)

OTHER PUBLICATIONS

Wen, Xin, et al. "Point2SpatialCapsule: Aggregating features and spatial relationships of local regions on point clouds using spatial-aware capsules." IEEE Transactions on Image Processing 29 (2020): 8855-8869. (Year: 2020).*

(Continued)

*Primary Examiner* — Jonathan S Lee
(74) *Attorney, Agent, or Firm* — Kim Thien Bui

(57) ABSTRACT

A system including one or more computers and one or more storage devices storing instructions that, when executed by the one or more computers, cause the one or more computers to implement a group-equivariant convolutional neural network configured to process a network input including a set of 3D points to generate an output tensor representing transformed features of the network input is described. The group-equivariant convolutional neural network includes a grouping layer, a switching layer, a pre-processing layer, a group-equivariant layer, a first subnetwork, an average pooling layer, a second subnetwork, an output subnetwork, and a final output layer.

20 Claims, 6 Drawing Sheets

(51) Int. Cl.
G06V 10/94 (2022.01)
G06V 10/24 (2022.01)

(56) References Cited

U.S. PATENT DOCUMENTS

| | | | |
|---|---|---|---|
| 10,970,518 B1 * | 4/2021 | Zhou | G06K 9/3233 |
| 11,182,612 B2 * | 11/2021 | Liu | G06T 7/73 |
| 2015/0006126 A1 | 1/2015 | Earl et al. | 345/419 |

FOREIGN PATENT DOCUMENTS

| | | |
|---|---|---|
| CN | 112149725 A | 12/2020 |
| CN | 109753995 B | 1/2021 |
| CN | 112257597 A | 1/2021 |
| CN | 110197223 B | 2/2021 |

OTHER PUBLICATIONS

Su, Zhaoyu, et al. "DV-ConvNet: Fully Convolutional Deep Learning on Point Clouds with Dynamic Voxelization and 3D Group Convolution." arXiv preprint arXiv:2009.02918 (2020). (Year: 2020).*
Zhang, Guanghui, et al. "RegionNet: Region-feature-enhanced 3D Scene Understanding Network with Dual Spatial-aware Discriminative Loss." 2020 IEEE/RSJ International Conference on Intelligent Robots and Systems (IROS). IEEE, 2020. (Year: 2020).*
Liu, Xinhai, et al. "LRC-Net: Learning discriminative features on point clouds by encoding local region contexts." Computer Aided Geometric Design 79 (2020): 101859. (Year: 2020).*
Sreevalsan-Nair, Jaya, and Akshay Jindal. "Using gradients and tensor voting in 3D local geometric descriptors for feature detection in airborne lidar point clouds in urban regions." 2017 IEEE International Geoscience and Remote Sensing Symposium (IGARSS). IEEE, 2017. (Year: 2017).*
Pinkus, A. (1999). Approximation theory of the MLP model in neural networks. Acta Numerica, 8, 143-195.
Qi, C. R., Su, H., Mo, K., & Guibas, L. J. (2017). Pointnet: Deep learning on point sets for 3d classification and segmentation. In Proceedings of the IEEE conference on computer vision and pattern recognition (pp. 652-660).
Ravanbakhsh, S.. (2020). Universal Equivariant Multilayer Perceptrons. Proceedings of the 37th International Conference on Machine Learning, in proceedings of Machine Learning Research 119:7996-8006.
Wenxuan Wu, Zhongang Qi, Li Fuxin; Proceedings of the IEEE/CVF Conference on Computer Vision and Pattern Recognition (CVPR), 2019, pp. 9621-9630.
Boulch, A. (2020). ConvPoint: Continuous Convolutions for Point Cloud Processing. Computers & Graphics.
Chao Chen, Guanbin Li, Ruijia Xu, Tianshui Chen, Meng Wang, Liang Lin; Proceedings of the IEEE/CVF Conference on Computer Vision and Pattern Recognition (CVPR), 2019.
Cohen, T. & Welling, M.. (2016). Group Equivariant Convolutional Networks. Proceedings of The 33rd International Conference on Machine Learning, in Proceedings of Machine Learning Research 48:2990-2999.
T. S. Cohen and M. Welling. (2016). Steerable cnns. arXiv preprint arXiv: 1612.08498.
Angela Dai, Angel X. Chang, Manolis Savva, Maciej Halber, Thomas Funkhouser, Matthias Niessner; Proceedings of the IEEE Conference on Computer Vision and Pattern Recognition (CVPR), 2017, pp. 5828-5839.
P. Hermosilla, T. Ritschel, P.-P. Vázquez, À. Vinacua, and T. Ropinski. (2018). Monte carlo convolution for learning on non-uniformly sampled point clouds. ACM Transactions on Graphics, 37(6):1-12.
J.-H. Jacobsen, B. De Brabandere, and A. W. Smeulders. (2017). Dynamic steerable blocks in deep residual networks. arXiv preprint arXiv: 1706.00598.

X. Jia, B. De Brabandere, T. Tuytelaars, and L. Van Gool. (2016). Dynamic filter networks. In NIPS.
S. Kim, J. Park, and B. Han. (2020). Rotation-invariant local-to-global representation learning for 3d point cloud. In H. Larochelle, M. Ranzato, R. Hadsell, M. F. Balcan, and H. Lin, editors, Advances in Neural Information Processing Systems, vol. 33, pp. 8174-8185, Curran Associates, Inc.
Kondor, R. (2018). N-body networks: a covariant hierarchical neural network architecture for learning atomic potentials. arXiv preprint arXiv:1803.01588.
Kondor, R., & Trivedi, S. (Jul. 2018). On the generalization of equivariance and convolution in neural networks to the action of compact groups. In International Conference on Machine Learning (pp. 2747-2755), PMLR.
Kumagai, W., & Sannai, A. (2020). Universal Approximation Theorem for Equivariant Maps by Group CNNs. arXiv preprint arXiv:2012.13882.
Li, X., Li, R., Chen, G., Fu, C. W., Cohen-Or, D., & Heng, P. A. (2021). A rotation-invariant framework for deep point cloud analysis. IEEE Transactions on Visualization and Computer Graphics.
Li, Y., Bu, R., Sun, M., Wu, W., Di, X., & Chen, B. (2018). Pointcnn: Convolution on x-transformed points. Advances in neural information processing systems, 31, 820-830.
Maron, H., Fetaya, E., Segol, N., & Lipman, Y. (May 2019). On the universality of invariant networks. In International conference on machine learning (pp. 4363-4371). PMLR.
Petersen, P., & Voigtlaender, F. (2020). Equivalence of approximation by convolutional neural networks and fully-connected networks. Proceedings of the American Mathematical Society, 148(4), 1567-1581.
Qi, C. R., Yi, L., Su, H., & Guibas, L. J. (2017). Pointnet++: Deep hierarchical feature learning on point sets in a metric space. arXiv preprint arXiv: 1706.02413.
Sabour, S., Frosst, N., & Hinton, G. E. (2017). Dynamic routing between capsules. arXiv preprint arXiv: 1710.09829.
Shen, W., Zhang, B., Huang, S., Wei, Z., & Zhang, Q. (2020). 3d-rotation-equivariant quaternion neural networks. In Computer Vision-ECCV 2020: 16th European Conference, Glasgow, UK, Aug. 23-28, 2020, Proceedings, Part XX 16 (pp. 531-547), Springer International Publishing.
Simonovsky, M., & Komodakis, N. (2017). Dynamic edge-conditioned filters in convolutional neural networks on graphs. In Proceedings of the IEEE conference on computer vision and pattern recognition (pp. 3693-3702).
Su, H., Jampani, V., Sun, D., Maji, S., Kalogerakis, E., Yang, M. H., & Kautz, J. (2018). Splatnet: Sparse lattice networks for point cloud processing. In Proceedings of the IEEE conference on computer vision and pattern recognition (pp. 2530-2539).
Tatarchenko, M., Park, J., Koltun, V., & Zhou, Q. Y. (2018). Tangent convolutions for dense prediction in 3d. In Proceedings of the IEEE Conference on Computer Vision and Pattern Recognition (pp. 3887-3896).
Thomas, N., Smidt, T., Kearnes, S., Yang, L., Li, L., Kohlhoff, K., & Riley, P. (2018). Tensor field networks: Rotation-and translation-equivariant neural networks for 3d point clouds. arXiv preprint arXiv:1802.08219.
Verma, N., Boyer, E., & Verbeek, J. (2018). Feastnet: Feature-steered graph convolutions for 3d shape analysis. In Proceedings of the IEEE conference on computer vision and pattern recognition (pp. 2598-2606).
Wood, J., & Shawe-Taylor, J. (1996). Representation theory and invariant neural networks. Discrete applied mathematics, 69(1-2), 33-60.
Worrall, D. E., Garbin, S. J., Turmukhambetov, D., & Brostow, G. J. (2017). Harmonic networks: Deep translation and rotation equivariance. In Proceedings of the IEEE Conference on Computer Vision and Pattern Recognition (pp. 5028-5037).
Wu, W., Qi, Z., & Fuxin, L. (2019). Pointconv: Deep convolutional networks on 3d point clouds. In Proceedings of the IEEE/CVF Conference on Computer Vision and Pattern Recognition (pp. 9621-9630).
Yarotsky, D. (2021). Universal approximations of invariant maps by neural networks. Constructive Approximation, 1-68.

(56) References Cited

OTHER PUBLICATIONS

Zhang, X., Qin, S., Xu, Y., & Xu, H. (2020). Quaternion product units for deep learning on 3d rotation groups. In Proceedings of the IEEE/CVF Conference on Computer Vision and Pattern Recognition (pp. 7304-7313).

Zhang, Z., Hua, B. S., Rosen, D. W., & Yeung, S. K. (Sep. 2019). Rotation invariant convolutions for 3d point clouds deep learning. In 2019 International Conference on 3D Vision (3DV) (pp. 204-213). IEEE.

Zhao, Y., Birdal, T., Lenssen, J. E., Menegatti, E., Guibas, L., & Tombari, F. ( Aug. 2020). Quaternion equivariant capsule networks for 3d point clouds. In European Conference on Computer Vision (pp. 1-19), Springer, Cham.

Kroese, D. P., Taimre, T., & Botev, Z. I. (2013). Handbook of monte carlo methods (vol. 706). John Wiley & Sons.

\* cited by examiner

GROUP-EQUIVARIANT CONVOLUTIONAL NEURAL NETWORKS FOR 3D POINT CLOUDS

BACKGROUND

This disclosure generally relates to neural networks configured to process three dimensional (3D) point clouds to perform a machine learning task.

3D point clouds are compact representations of 3D objects and can be generated from laser cameras, LIDAR or RGB-Depth sensors. A 3D point cloud includes a set of 3D points that are arranged in irregular and unordered positions. 3D point clouds generally depend on locations and orientations of sensors or cameras used to capture the point clouds, since capturing the same object from different locations or angles may produce different data.

SUMMARY

In general, one innovative aspect of the subject matter described in this specification can be embodied in a system that includes one or more computers and one or more storage devices storing instructions that, when executed by the one or more computers, cause the one or more computers to implement a neural network configured to process a network input including a set of 3D points to generate an output tensor representing transformed features of the network input. The neural network includes:
  a grouping layer configured to group the set of 3D points into a plurality of 3D point clouds, each 3D point cloud having a respective centroid, wherein each 3D point in the set of 3D points belongs to one or more 3D point clouds, and each 3D point cloud has a set of initial features;
  a switching layer configured to select a set of group-equivariant transformations and a set of contributing weights;
  a pre-processing layer configured to compute, for each 3D point cloud, a respective set of local coordinates with respect the respective centroid and a respective set of local distances to the respective centroid;
  a group-equivariant layer configured to process the respective set of local coordinates to generate a respective set of transformed group-equivariant features by applying the set of group-equivariant transformations on each local coordinate in the respective set of local coordinates;
  a first subnetwork configured to process the respective set of transformed group-equivariant features and the set of contributing weights to generate a respective set of convoluted transformed features;
  an average pooling layer configured to process the respective set of convoluted transformed features to generate respective average convoluted transformed features;
  a second subnetwork configured to process the respective set of local distances to generate respective transformed local distance features;
  an output subnetwork configured to process the respective transformed local distance features, the set of initial features of the 3D point cloud, and the respective average convoluted transformed features to generate the respective intermediate output tensor for the 3D point cloud; and
  a final output layer configured to aggregate all respective intermediate output tensors of all 3D point clouds to generate the output tensor representing the transformed features of the network input.

Other embodiments of this aspect include corresponding methods, apparatuses, and computer programs, configured to perform the actions of the methods, encoded on computer storage devices.

The subject matter described in this specification can be implemented in particular embodiments so as to realize one or more of the following technical advantages.

The techniques described in this specification allow neural networks to be trained in a more computationally efficient manner while still achieving comparable or better performance compared to existing systems by using group equivariant techniques. In particular, 3D point cloud data obtained by using a laser camera, LIDAR or RGB-Depth sensor depends on the location and the rotation angle of the camera or sensor. Different locations and different rotations angle would produce different point cloud data although the data may come from the same object. Thus, existing systems use the augmentation technique in order to handle this issue. However, when using the augmentation technique, the size of training data grows significantly, thus incurring expensive computational costs for training.

In contrast, the techniques described herein induce group equivariance under transformations such as permutation, translation and rotation in neural network architectures in order to improve generalization and data efficiency of neural networks for 3D point clouds. Thus, neural network systems that implement the described techniques have a group equivariant property, i.e., the outputs of these systems do not change or change in a predictable way when a grouping operation acts on the inputs of the systems. Therefore, these systems would require less training data to learn than conventional systems, because the augmentation technique can be reduced in training by, for example, selecting a suitable group equivariance. As a result, systems that implement the described techniques can reduce the amount of computational resources (e.g., memory) needed for training Second, by incorporating a group equivariant property into a neural network, the described techniques allow the neural network to perform operations including, but not limited to:
  resizing a given 3D point cloud to a required size of the model;
  transforming the resized data to a tensor form required by the model;
  segmenting or classifying the given 3D point cloud using the tensor form; and
  presenting outputs of the model.

Neural network systems that implement the described techniques can obtain better performance on machine learning tasks such as image classification and semantic segmentation tasks that involve objects or images represented as 3D point clouds. For example, for the classification benchmark, the neural network systems can outperform state-of-the-art deep neural networks for 3D point clouds when dealing with rotated data. For semantic segmentation benchmark, the neural network systems can outperform state-of-the-art models by a significant margin.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations that includes a group-equivariant convolutional neural network configured to process a network input including a set of 3D points to generate an output tensor representing transformed features of the network input. The set of 3D points can represent one or more real-life objects in an environment. The output tensor can be used to perform a machine learning task such as a classification task or a semantic segmentation task.

In particular, as described above, 3D point cloud data obtained by using a laser camera, LIDAR or RGB-Depth sensor depends on the location and the rotation angle of the camera or sensor. Different locations and different rotations angle would produce different point cloud data although the data may come from the same object. Thus, existing systems use the augmentation technique in order to handle this issue. However, when using the augmentation technique, the size of training data grows significantly, thus incurring expensive computational costs for training.

To reduce the computational costs, the neural network system described herein incorporates group equivariance with one or more transformations including, but not limited to, permutation, translation and rotation to improve generalization and data efficiency of the system when dealing with 3D point cloud data. Group equivariance is a property of a function from one space to another space, where the two spaces are vector spaces and there are actions of a group on them. Generally, a function may be called equivariant if, when an input is changed, then an output will be changed in a predictable way. A function is called group equivariant if when the input is changed by a group action, then the output will be changed in the same way as the group action.

Figure 1:
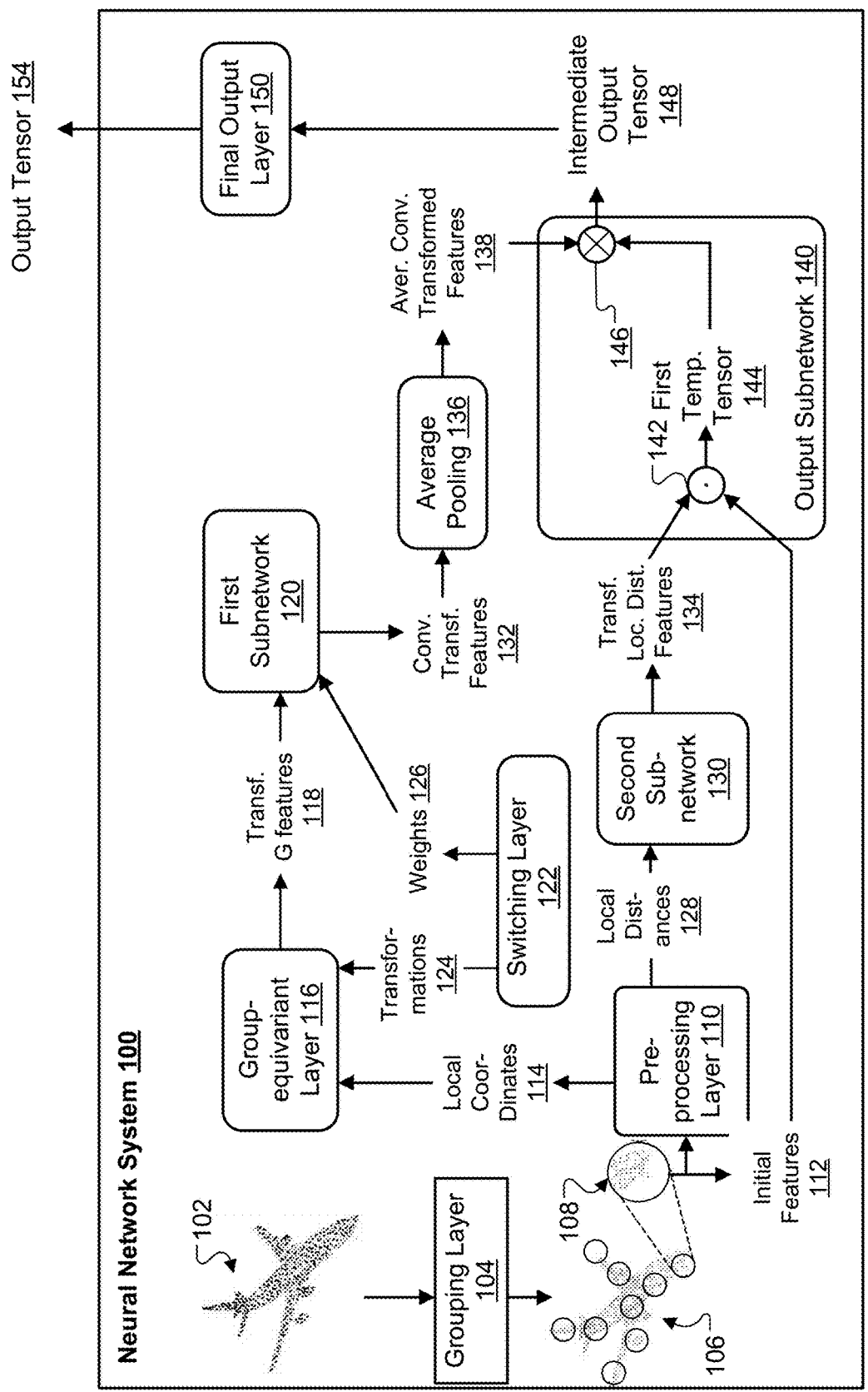
FIG. 1 shows an example neural network system that includes a group-equivariant convolutional neural network.

FIG. 1 shows an example neural network system 100. The system 100 is an example of a system implemented as computer programs on one or more computers in one or more locations, in which the systems, components, and techniques described below can be implemented. The neural network system 100 includes a group-equivariant convolutional neural network 150 that is configured to process a network input 102 that includes a set of 3D points to generate an output tensor 154 representing transformed features of the network input 102.

Before the architecture of the neural network system is described in detail, the following terminologies and concepts are introduced.

Groups and Examples of Groups

A group G is a nonempty set of elements and is equipped with a binary operation referred to as a "product" such that the group G satisfies the following conditions:

the product of two elements in G is again an element in G, if the product ab of two elements a and b is applied with the third element c, then the obtained result is the same as the product of a and bc, there exists an identity element, denoted as e, such that ea=ae=a for every a, and every element a in G has an inverse, i.e., another element b such that ab=ba=e.

The group G can be a group of one or more transformations including, but not limited to, permutation, translation, rotation, reflection, scale, or any other transformation, or any combination thereof.

For example, the group G can be a group of all rotations g in $\mathbb{R}^3$ and its subgroups. The set of all rotations in $\mathbb{R}^3$ is denoted by SO(3). Each element g of SO(3) can be represented by using orthogonal matrices with real entries, for example, by using orthogonal 3×3 matrices with real entries denoted as $M_{3\times 3}(\mathbb{R})$, as follows:

$$SO(3)=\{g \in M_{3\times 3}(\mathbb{R}) | g^T g = gg^T = I_3 \text{ and } \det(g)=1\}.$$

There is a one-to-one correspondence between a subgroup of SO(3) (up to isomorphism, which is a structure-preserving mapping between two structures of the same type that can be reversed by an inverse mapping) and a triple of natural numbers (m, l, p) such that $$\frac{1}{m} + \frac{1}{l} + \frac{1}{p} > 1.$$

The correspondence is as follow: for each triple of natural numbers (m, l, p), the corresponding subgroup is the von Dyck type of the form:

$$D(g_1,g_2,g_3)=\langle g_1,g_2,g_3 | g_1^m = g_2^n = g_3^p = g_1 g_2 g_3 = I_3 \rangle,$$

for some matrices $g_1$, $g_2$, $g_3$.

Group Actions

Let G be a group and V be a vector space. Generally, "G acts on V" means, if for each element g in G and vector v in V, there is always a vector g*v in V. The action "*" satisfies the following conditions:

if e is the identity in G, then e*v=v for every vector v in V (i.e. the identity e of G acts identically on vectors in V), and if g and h are elements in G, then g*(h*v)=(gh)*v for every vector v in V (i.e. if g acts on the action of h on v, then the same result as the product (gh) acts on v is obtained).

More specifically, a linear mapping from $\mathbb{R}^3$ to itself is called an automorphism of $\mathbb{R}^3$. Each rotation defines an automorphism of $\mathbb{R}^3$ (by matrix-vector multiplication). This means that there is a map from the rotation group to the set of automorphisms of $\mathbb{R}^3$. This is a particular example of how a group act on a vector space.

Let Aut(V) denote a set of automophisms of the vector space V. An action of a group G to the vector space V is a map $f: G \to \text{Aut}(V)$ which preserves the group operation. In particular, $$f(g_1 g_2) = f(g_1) f(g_2)$$

for arbitrary elements $g_1$, $g_2$ in G.

If G acts on a vector space V, then G will act on every objects built on V. As an important case, G acts on a vector space V, then G also acts on the space of all functions on V. The action is defined as follow: if g is an element in the group G, then g correspond to a map between functions, say $f \mapsto gf$, where $gf$ is defined from $f$ by:

$$[gf](x) = f(g^{-1}x), \text{ for every } x \in V.$$

For example, if a rotation group G acts on $\mathbb{R}^3$, then G also acts on 3D point clouds. Let $L = C(\mathbb{R}^3, \mathbb{R}^r)$ be the set of continuous functions in $\mathbb{R}^3$ with values in $\mathbb{R}^r$. Note that each point clouds with feature vectors of dimension r are considered as an element in L. Then the action of G on L can be described as follows: each rotation g will correspond to a function transformation $F \mapsto gF$ from L to itself, where gF is a function defined by $[gF](x) = F(g^{-1}x)$ for every $x \in \mathbb{R}^3$. Here, $g^{-1}x$ is a matrix-vector multiplication.

In other words, the action of the rotation group G on the space L can be described as follows: when an image is rotated due to the direction g, then the feature vector of the new image at the coordinate x (which is [gF](x)) is exactly the feature vector of the old image at the coordinate $g^{-1}x$ (which is $F(g^{-1}x)$).

Group Equivariance and Group Equivariant Function

Recall that, group equivariance is a property of a function from one space to another space, where the two spaces are vector spaces and there are actions of a group on them. Generally, a function may be called equivariant (or group equivariant, or G-equivariant) if, when an input is changed, then an output will be changed in a predictable way. A function is called group equivariant if when the input is changed by a group action, then the output will be changed in the same way as the group action.

In particular, let G be a group, A and B be vector spaces, and assuming that G acts on A and B Let f be a function from A to B. f is G-equivariant when, if for every element g in G and vector v in A, the following condition is satisfied:

$$f(g*v) = g*f(v),$$

i.e., if g acts on the vector and then f is applied to the result, the same result as g acts on f(v) is obtained.

For example, assuming that the group G acts on $\mathbb{R}^r$ and $\mathbb{R}^s$. Let $f: C(\mathbb{R}^r, \mathbb{R}^{d_r}) \to C(\mathbb{R}^s, \mathbb{R}^{d_s})$ be a (linear or nonlinear) transformation. $f$ is G-equivariant if and only if $f(gF) = [gf](F)$ for every g in G and F in $C(\mathbb{R}^r, \mathbb{R}^{d_r})$.

Feed Forward Neural Networks (FFNNs) and Convolutional Neural Networks (CNNs)

A feed-forward neural network (FFNN) includes multiple neurons that are arranged in L+1 layers. Each neuron can be a number, a vector, or a tensor. The first layer (the 0-th layer) is the input layer. The last layer (the L-th layer) is the output layer. Layers between the first and the last layers are called hidden layers. Each layer can be considered as a function from the set of indices using to index the neurons to the vector space containing the values of the neurons, i.e., the feature vector.

In neural networks described in this specification, the neurons in the input layer are indexed by the spatial space $\mathbb{R}^3$, where $\mathbb{R}$ is the set of real numbers. Each point cloud can be viewed as a function from a finite subset of $\mathbb{R}^3$ to $\mathbb{R}^d$, where d is the dimension of the feature vectors. The domain of this function can be extended from the finite subset to the whole $\mathbb{R}^3$, and then each point cloud can be considered as a continuous function from $\mathbb{R}^3$ to $\mathbb{R}^d$. The set of all such continuous function is denoted by $C(\mathbb{R}^3, \mathbb{R}^d)$. By considering point clouds as continuous functions, the techniques described herein applies strong results in mathematics to develop suitable FFNNs for point clouds.

In general, neurons are indexed by the coordinates in $\mathbb{R}^r$ for some nonnegative integer r. Therefore, each layer can be viewed as a continuous function from $\mathbb{R}^r$ to $\mathbb{R}^d$ for some nonnegative integer d. The set of all such continuous functions is denoted by $C(\mathbb{R}^r, \mathbb{R}^d)$.

A map between the i-th layer to the (i+1)-layer is a transformation $f$ from $C(\mathbb{R}^{r_i}, \mathbb{R}^{d_i})$ to $C(\mathbb{R}^{r_{i+1}}, \mathbb{R}^{d_{i+1}})$ which maps each layer F in $C(\mathbb{R}^{r_i}, \mathbb{R}^{d_i})$ to a layer $f(F)$ in $C(\mathbb{R}^{r_{i+1}}, \mathbb{R}^{d_{i+1}})$.

An FFNN is defined to be a sequence of transformation $$f_1 \mapsto f_2 \mapsto \ldots \mapsto f_L$$

of transformations, where each $f_i$ is a linear or nonlinear transformation between the i-th layer $C(\mathbb{R}^{r_i}, \mathbb{R}^{d_i})$ to the (i+1)-layer $C(\mathbb{R}^{r_{i+1}}, \mathbb{R}^{d_{i+1}})$. The convolutional product is one of the key transformations in a CNN.

Group-Equivariant Convolutional Neural Network

A group-equivariant convolutional neural network includes a group-equivariant convolution. A group equivariant convolution has a convolution map that is a group-equivariant function. In particular, assuming that a group G acts on the space of images, then the result obtained when an element g of to acts on an image F and then a convolution is applied to the result must be the same as what is obtained when g acts on the convolution of F. In other words, a convolution map with kernel W in $C(\mathbb{R}^3, \mathbb{R}^d)$ is a transformation from $C(\mathbb{R}^3, \mathbb{R}^d)$ to $C(\mathbb{R}^3, \mathbb{R})$ which maps each feature image $F \in C(\mathbb{R}^3, \mathbb{R}^d)$ to another feature image $[W*F] \in C(\mathbb{R}^3, \mathbb{R})$. This convolution W is called a G-equivariant convolution if $$W*[gF] = g[W*F]$$

for every rotation g in G and F in $C(\mathbb{R}^3, \mathbb{R}^d)$. The above equation means that the convolution product of W and the rotation of F by g is the same as the convolution product [W*F] rotated by g.

A group-equivariant convolution is analyzed in more detail as follows. Let G be a compact group and $[W*^G]$ be a convolutional map with kernel $W \in C^\infty(\mathbb{R}^3, \mathbb{R}^r)$. The convolutional map maps each feature $F \in C^\infty(\mathbb{R}^3, \mathbb{R}^r)$ to a new feature $[W*^G F] \in C(\mathbb{R}^3, \mathbb{R})$ by:

$$[W*^G F](x) = \int_{y \in \mathbb{R}^3} W^G(x-y) F(y) dy, \qquad (1)$$

where $$W^G(x-y) = \int_{g \in G} W(g(x-y)) d\mu(g), \qquad (2)$$

and μ is the Borel measure on G. Then $[W*^G -]$ is G-equivariant.

The integration defining $[W*^G F]$ in Eq. (1) is of a continuous form and hard to compute. To enable computational feasibility, the techniques described herein approximate this integration by using (i) a finite sum with weights, and (ii) the importance sampling Monte-Carlo method, as described below.

(1) Approximate the Integration in Over G in Eq. (2) by a Finite Sum with Weights For a positive integer M, a set of measurable subsets of G, denoted as $T = [T_1, T_2, \ldots, T_M]$, and a finite set of elements in G, denoted as $U = [g_1, g_2, \ldots, g_M]$, such that T forms a partition of G and $g_j$ belongs to $T_j$ for every j are selected. M is the number of elements (i.e., transformations) chosen from G. The integration over G given in Eq. (2) can be approximated by:

$$W^G(x-y) \approx \frac{1}{M}\sum_{j=1}^{M} s_j W(g_i(x-y)), \quad (3)$$

where $s_j$ denotes a contributing weight, and where $s_j = M\mu(T_j)$ is M times the measure of $T_j$.

In order to determine the sum in the right hand side of Eq. (3), the described techniques extract, from the group G, a set of transformations (also referred to as "a set of representatives") $U=[g_1, g_2, \ldots, g_M]$ and the corresponding contributing weights $S=[s_1, s_2, \ldots, s_M]$. With suitable representatives and weights, the sum given in the right side of Eq. (3) can approximate $W^G(x-y)$ in arbitrary precision.

(2) Approximate the Integration in Eq. (1) by Monte-Carlo Method

The described techniques approximate the integration in Eq. (1) by using the importance sampling Monte-Carlo method of a continuous group-equivariant convolution mapping, as shown below:

$$[W *^G F](x) \approx \sum_{y \in X} R(\|x-y\|) W^G(x-y) F(y), \quad (4)$$

where X is the considered 3D point cloud that includes multiple 3D points y. In Eq. (4), the function $R(.)=R(\|.\|)$ represents the inverse density of the 3D point cloud around the considered 3D points. The function $W^G$ is the integration over G given in Eq. (2). Using the approximation given in Eq. (4), integration defining $[W *^G F]$ in Eq. (1) can be approximated as follows:

$$[W *^G F](x) \approx \sum_{y \in X} R(\|x-y\|)\left(\frac{1}{M}\sum_{j=1}^{M} s_j W(g_j(x-y))\right) F(y). \quad (5)$$

In Eq. (5), the representatives $g_j$ and the weights $s_j$ are selected by a switching neural network layer in advance from the group G. The function R and W will be approximated by subnetworks such as Multi-layer Perceptron (MLP) neural networks. The architecture and functionalities of these network components will be described in detail below in connection to FIG. 1.

Referring back to FIG. 1, the neural network system 100 includes a group-equivariant convolutional neural network 150 that is specifically constructed to perform the approximation given in Eq. (5). The group-equivariant convolutional neural network 150 includes multiple neural network layers and subnetworks: a grouping layer 104, a pre-processing layer 110, a group-equivariant layer 116, a switching layer 122, a first subnetwork 120, an average pooling layer 136, a second subnetwork 130, an output subnetwork 140, and a final output layer 152. Other components may also be included in the network 150 and the system 100. The neural network 150 has a plurality of network parameters that can be determined by training the neural network to perform a machine learning task (e.g., an image classification task or a segmentation task).

The grouping layer 104 is configured to receive a network input 102 that includes a set of 3D points. The set of 3D points may represent one or more real-life objects in an environment. For example, the one or more real-life objects may include one or more of a vehicle (e.g., an airplane, a car, a truck, a bike, a scooter, or a bicycle), a human, a tree, a traffic light, a pavement, a table, a chair, a sofa, a computer, or any other object in an environment.

The grouping layer 104 is configured to group the set of 3D points into a plurality of 3D point clouds 106. Each 3D point cloud has a respective centroid. Each 3D point may belong to one or more 3D point clouds. Each 3D point cloud has a set of initial features 112.

For example, the 3D point cloud 108 has a centroid x and a set of initial features $\{F(y_1), F(y_2), \ldots, F(y_q)\}$, where $y_1, y_2, \ldots, y_q$ denotes the 3D points included in the 3D point cloud 108. The initial features F(y) of each 3D point y may include, for example, 3D coordinates of the 3D point y and its RGB colors.

The switching layer 122 is configured to select a set of group-equivariant transformations 124 and a set of contributing weights 126.

The set of group-equivariant transformations can be denoted as $U=\{g_1, g_2, \ldots, g_M\}$ and a set of contributing weights can be denoted as $S=\{s_1, s_2, \ldots, s_M\}$.

The set of group-equivariant transformations may include one or more of translation, permutation, rotation, reflection, scale, or any combination thereof. In some implementations, the set of group-equivariant transformations represents a finite set of transformations. In some other implementations, the set of group-equivariant transformations represents an infinite set of rotations.

The process for selecting U and S is described in more detail below with reference to FIG. 2, FIG. 3, FIG. 4, and FIG. 5.

The pre-processing layer 110 is configured to compute, for each 3D point cloud (e.g., 3D point cloud 108), a respective set of local coordinates 114 with respect the respective centroid and a respective set of local distances 128 to the respective centroid. For example, the layer 110 is configured to compute, for the 3D point cloud 108, a respective set of local coordinates $\{x-y_1, x-y_2, x-y_3, \ldots, x-y_q\}$ of the 3D points in the 3D point cloud 108 with respect to the centroid x and a respective set of local distances $\{\|x-y_1\|, \|x-y_2\|, \|x-y_3\|, \ldots \|x-y_q\|\}$ from the 3D points to the centroid x.

The group-equivariant layer 116 is configured to process the respective set of local coordinates 114 to generate a respective set of transformed group-equivariant features 118 by applying the set of group-equivariant transformations 124 on each local coordinate in the respective set of local coordinates 114. In particular, the respective set of transformed group-equivariant features 118 can take the following form:

$$\frac{\begin{matrix} g_1(x-y_1) & g_M(x-y_1) \\ g_1(x-y_2) & g_M(x-y_2) \\ \ldots & \ldots \\ g_1(x-y_q) & g_M(x-y_q) \end{matrix}}{M}$$

where $\{g_1, g_2, \ldots, g_M\}$ is the set of group-equivariant transformations selected by the switching layer 122.

The first subnetwork 120 is configured to process the respective set of transformed group-equivariant features 118 and the set of contributing weights 126 to generate a respective set of convoluted transformed features 132. In particular, the respective set of convoluted transformed features 132 of the 3D point cloud 108 can be expressed as follows:

$$\frac{\begin{matrix} s_1 W(g_1(x-y_1)) & s_M W(g_M(x-y_1)) \\ s_2 W(g_1(x-y_2)) & s_M W(g_M(x-y_2)) \\ \ldots & \ldots \\ s_1 W(g_1(x-y_q)) & s_M W(g_M(x-y_q)) \end{matrix}}{M}$$

where $S=\{s_1, s_2, \ldots, s_M\}$ is the set of contributing weights selected by the switching layer 122, and W(.) denotes the first subnetwork 120. In some implementations, the first subnetwork 120 is a feed-forward neural network, e.g., a multi-layer perceptron (MLP) neural network. For example, the first subnetwork 120 is WeightNet. The architecture of WeightNet is described in detail in Wu et al., PointConv: Deep Convolutional Networks on 3D Point Clouds, CVPR 2019.

The average pooling layer 136 is configured to process the respective set of convoluted transformed features 132 to generate respective average convoluted transformed features 138. In particular, the layer 136 applies an average pooling operation to the respective set of convoluted transformed features 132 to generate the respective average convoluted transformed features 138 that can be expressed as follows:

$$\frac{1}{M} \sum_{j=1}^{M} s_j W(g_j(x-y_1))$$

$$\frac{1}{M} \sum_{j=1}^{M} s_j W(g_j(x-y_2))$$

$$\ldots$$

$$\frac{1}{M} \sum_{j=1}^{M} s_j W(g_j(x-y_q))$$

The second subnetwork 130 is configured to process the respective set of local distances 128 to generate respective transformed local distance features 134, which can be expressed as follows:

$$R(\|x-y_1\|)$$

$$R(\|x-y_2\|)$$

$$\ldots$$

$$R(\|x-y_q\|)$$

where R(.) denotes the second subnetwork 130. In some implementations, the second subnetwork 130 is a feed-forward neural network, e.g., a multi-layer perceptron (MLP) neural network. For example, the second subnetwork 130 is DensityNet. The architecture of DensityNet is described in detail in Wu et al., PointConv: Deep Convolutional Networks on 3D Point Clouds, CVPR 2019.

The output subnetwork 140 is configured to process the respective transformed local distance features 134, the respective initial features 112, and the respective average convoluted transformed features 138 to generate the respective intermediate output tensor 148 for the 3D point cloud.

In particular, the output subnetwork 140 includes a first multiplication layer 142 configured to multiply the respective transformed local distance features 134 with the respective initial features 112 of the 3D point cloud to generate a first respective temporary tensor 144 for the 3D point cloud. In particular, the first respective temporary tensor 144 is computed as follows:

$$R(\|x-y_1\|)F(y_1)$$

$$R(\|x-y_2\|)F(y_2)$$

$$\ldots$$

$$R(\|x-y_q\|)F(y_q)$$

The output subnetwork 140 further includes a convolutional layer 146 configured to multiply the first respective temporary tensor 144 with the respective average convoluted transformed features 138 to generate the respective intermediate tensor 148 for the 3D point cloud. The convolutional layer 146 can be a 1×1 convolutional layer.

In particular, the respective intermediate tensor 148 for the 3D point cloud can be computed as follows:

$$\sum_{y \in X} R(\|x-y\|) \left( \frac{1}{M} \sum_{j=1}^{M} s_j W(g_j(x-y)) \right) F(y).$$

The above formula is an approximation of $[W*^G F](x)$ in Eq. (1). This approximation is shown in Eq. (5) above, copied below:

$$[W *^G F](x) \approx \sum_{y \in X} R(\|x-y\|) \left( \frac{1}{M} \sum_{j=1}^{M} s_j W(g_j(x-y)) \right) F(y). \quad (5)$$

The network 150 is configured to repeat the above process for all other 3D point clouds in the plurality of 3D point clouds 106 and to compute, for each 3D point cloud, a respective intermediate output tensor.

The final output layer 152 is configured to aggregate all respective intermediate output tensors of all 3D point clouds to generate the output tensor 154 representing the transformed features of the network input 102. For example, the final output layer 152 can concatenate all respective intermediate output tensors of all 3D point clouds to generate the output tensor 154.

In some implementations, the neural network system 100 may use the output tensor 154 to perform a machine learning task. In some other implementations, the system 100 may provide the output tensor 154 to another system that uses the output tensor 154 to perform a machine learning task.

Figure 2:
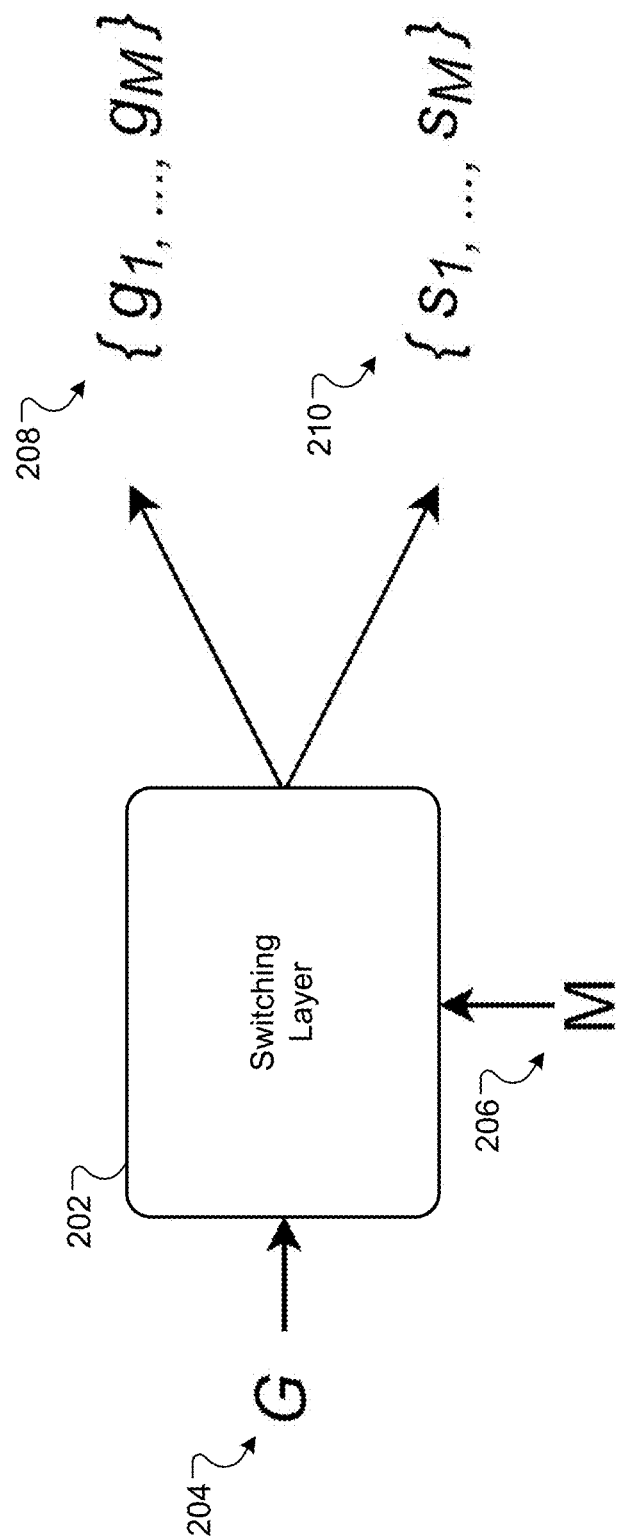
FIG. 2 shows a process for selecting a set of group-equivariant transformations and a set of contributing weights for general groups.

FIG. 2 shows a process for selecting a set of group-equivariant transformations $U=[g_1, g_2, \ldots, g_M]$ (208) and a set of contributing weights $S=[s_1, s_2, \ldots, s_M]$ (310) for general groups. In general, U and S can be chosen arbitrary for any given positive integer M. The general procedure for choosing U and S is formulated in FIG. 2.

The switching layer 202 receives as input a value of M (206) and G (204). M represents a size of U and S, and G represents a group of transformations. Based on the input, the switching layer 202 selects a set of group-equivariant transformations $U=\{g_1, g_2, \ldots, g_M\}$ (208) and a set of contributing weights $S=\{s_1, s_2, \ldots, s_M\}$ (210).

Figure 3:
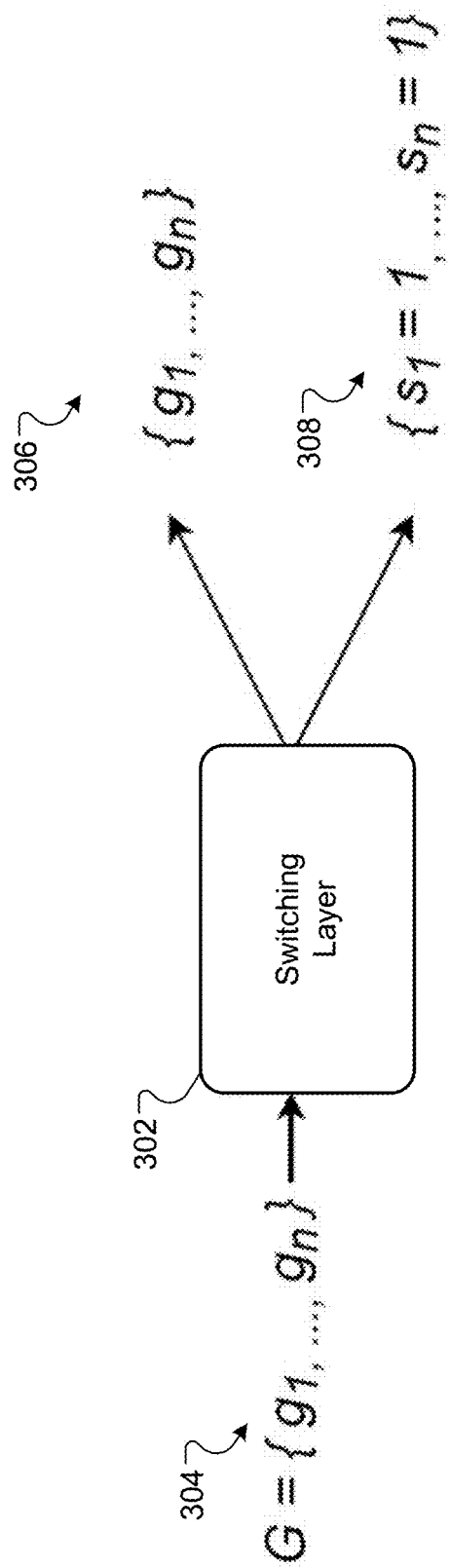
FIG. 3 shows a process for selecting a set of group-equivariant transformations and a set of contributing weights for finite groups.

FIG. 3 shows a process for selecting a set of group-equivariant transformations and a set of contributing weights for finite groups.

The switching layer 302 receives as input a group of transformations G={$g_1, \ldots, g_n$} (304). G represents a finite set of transformations. The switching layer 302 then selects M=n, U=G={$g_1, \ldots, g_n$} (406) and S={$s_1=1, s_2=1, \ldots, s_n=1$} (308). Using these representatives and weights in the architecture of the group-equivariant neural network 150 in FIG. 1, the approximation in Eq. 5 can be transformed to the following form:

$$[W *^G F](x) \approx \Sigma_{y \in X} R(x-y) W^G(x-y) F(y), \quad (6)$$

where X is the considered point cloud, and G is a finite group of transformations.

Figure 4:
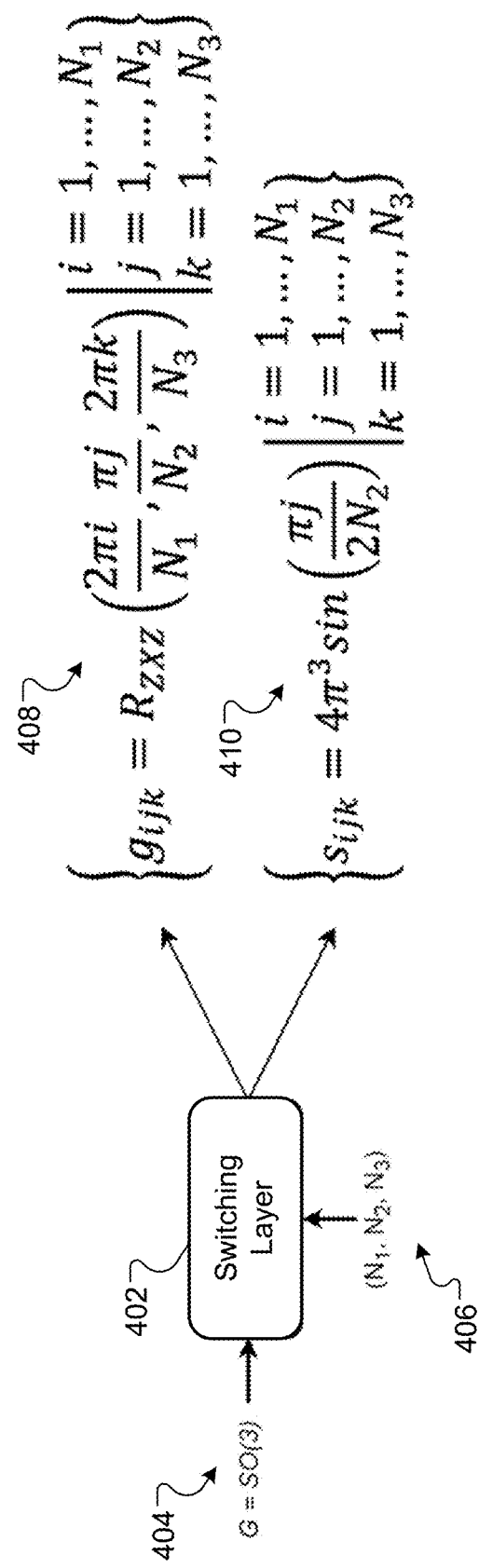
FIG. 4 illustrates a process for selecting a set of group-equivariant transformations and a set of contributing weights for an infinite group of rotations using Riemann sum method.
Figure 5:
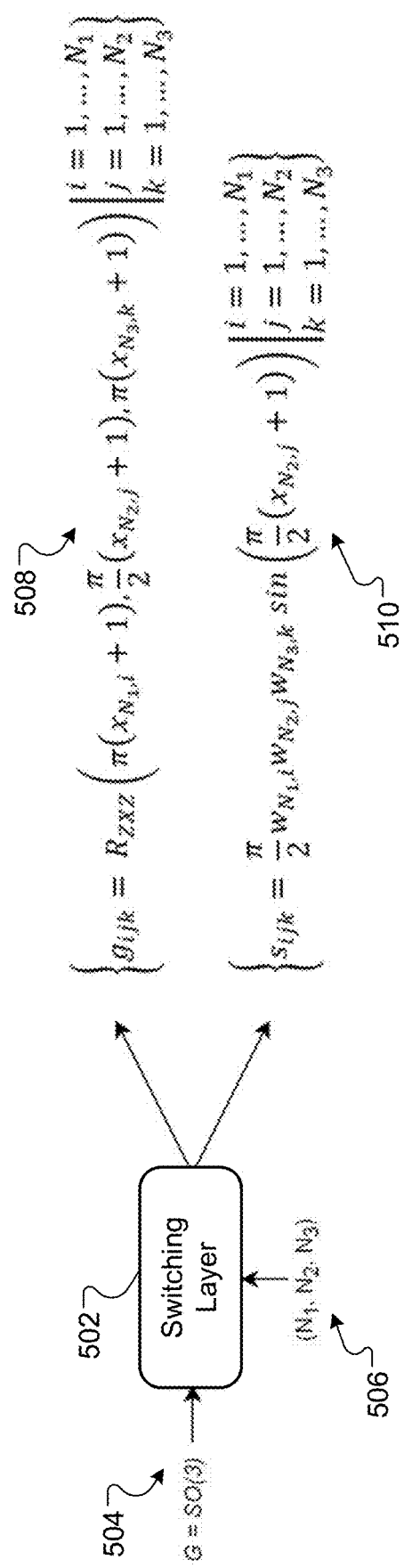
FIG. 5 illustrates a process for selecting a set of group-equivariant transformations and a set of contributing weights for an infinite group of rotations using Gauss-Legendre quadrature method.

FIG. 4 and FIG. 5 illustrate processes for selecting a set of group-equivariant transformations and a set of contributing weights when G is an infinite set of rotations SO(3) by using Riemann sum method and Gauss-Legendre quadrature method, respectively.

The rotation group SO(3) is parameterized by using ZXZ Euler angles representations. Using this representation, a rotation in SO(3) is represented as a rotation along the Oz-axis, composing with a rotation along the Ox-axis, then composing with a rotation along the Oz-axis again. In particular, any rotation in SO(3) can be written of the form:

$$R_{zxz}(a,b,c) = R_z(a) R_x(b) R_z(c),$$

where $$R_z(a) = \begin{pmatrix} \cos(a) & -\sin(a) & 0 \\ \sin(a) & \cos(a) & 0 \\ 0 & 0 & 1 \end{pmatrix} \text{ and } R_x(b) = \begin{pmatrix} 1 & 0 & 0 \\ 0 & \cos(b) & -\sin(b) \\ 0 & \sin(b) & \cos(b) \end{pmatrix}$$

are the fundamental rotations and (a, b, c)∈[0,2π]×[0,π]×[0,2π]. Using this parametrization, the integration given in Eq. (2) can be transformed as follows:

$$W^G(x-y) = \int_0^{2\pi} \int_0^{\pi} \int_0^{2\pi} W(R_{zxz}(a,b,c) \cdot (x-y)) \sin\left(\frac{b}{2}\right) da\, db\, dc. \quad (7)$$

This is an integration over the 3D rectangle T=[0,2π]×[0,π]×[0,2π]. This integration can be approximated by using either Riemann sum method or Gauss-Legendre quadrature method.

Approximation Using Riemann Sum Method

As shown in FIG. 4, the switching layer 402 is configured to receives as input a group G and a triple of positive integers [$N_1, N_2, N_3$]. G is a group of infinite rotations SO(3) in 3D space. Based on the input, the switching layer 402 selects a set of group-equivariant transformations 408 and a set of contributing weights 410 using the Riemann sum method.

In particular, given a triple of positive integers [$N_1, N_2, N_3$], the switching layer 402 separates the rectangle T into a union of sub-rectangles:

$$T_{ijk} = \left[\frac{2\pi(i-1)}{N_1}, \frac{2\pi i}{N_1}\right] \times \left[\frac{\pi(j-1)}{N_2}, \frac{\pi j}{N_2}\right] \times \left[\frac{2\pi(k-1)}{N_3}, \frac{2\pi j}{N_3}\right]$$

for i=1, \ldots, $N_1$; j=1, \ldots, $N_2$; and k=1, \ldots, $N_3$.

It is noted that $$\left(\frac{2\pi i}{N_1}, \frac{\pi j}{N_2}, \frac{2\pi k}{N_3}\right) \in T_{ijk},$$

and the volume of each sub-rectangle is the same and is equal to $$\frac{4\pi^3}{N_1 N_2 N_3}.$$

Using the Riemann sum approximation method, the triple integration given in Eq. (7) can be transformed to the following form:

$$W^G(x-y) \approx \frac{4\pi^3}{N_1 N_2 N_3} \sum_{\substack{i=1,\ldots,N_1 \\ j=1,\ldots,N_2 \\ k=1,\ldots,N_3}} W\left(R_{zxz}\left(\frac{2\pi i}{N_1}, \frac{\pi j}{N_2}, \frac{2\pi k}{N_3}\right) \cdot (x-y)\right) \sin\left(\frac{\pi j}{2N_2}\right).$$

By selecting the set of group-equivariant transformations 408 as follows:

$$g_{ijk} = R_{zxz}\left(\frac{2\pi i}{N_1}, \frac{\pi j}{N_2}, \frac{2\pi k}{N_3}\right)$$

and by selecting the set of contributing weights 410 as follows:

$$s_{ijk} = 4\pi^3 \sin\left(\frac{\pi j}{2N_2}\right),$$

the integration given in Eq. (2) can be approximated as follows:

$$W^G(x-y) \approx \frac{1}{N_1 N_2 N_3} \sum_{ijk} W(g_{ijk} \cdot (x-y)) s_{ijk}. \quad (8)$$

Using Eq. (8), the convolution [$W *^G F$] in Eq. (1) can be approximated as follows:

$$[W *^G F](x) \approx \sum_{y \in X} R(\|x-y\|) \left(\frac{1}{N_1 N_2 N_3} \sum_{ijk} W(g_{ijk} \cdot (x-y)) s_{ijk}\right) F(y). \quad (9)$$

That means, the approximation given in Eq. (5) can be reduced to a form given in Eq. (9).

Approximation Using Gauss-Legendre Quadrature Method

As shown in FIG. 5, the switching layer 502 is configured to receives as input a group G and a triple of positive integers [$N_1, N_2, N_3$]. G is a group of infinite rotations SO(3) in 3D space. Based on the input, the switching layer 502 selects a set of group-equivariant transformations 508 and a set of contributing weights 510 using the Gauss-Legendre quadrature method.

Gauss-Legendre quadrature method uses a rule to approximate an integration of a continuous function $f(t)$ over the interval $[-1,1]$ as $$\int_{-1}^{1} f(t)dt \approx \sum_{i=1}^{N} w_{N,i} f(x_{N,i}),$$

where N is the number of sample points; the nodes $x_{N,i}$ are the roots of the Legendre polynomial $P_N(t)$ of degree N; and $$w_{N,i} = \frac{2}{(1-x_{N,i}^2)[P'_N(x_{N,i})]^2}$$

are the quadrature weights.

Given a triple $[N_1, N_2, N_3]$, by applying the Gauss-Legendre quadrature rule three times, the integration given in Eq. (7) can be approximated as follows:

$$W^G(x-y) \approx \frac{\pi}{16 N_1 N_2 N_3} \sum_{\substack{i=1,\ldots,N_1 \\ j=1,\ldots,N_2 \\ k=1,\ldots,N_3}} w_{N_1,i} w_{N_2,j} w_{N_3,k}$$

$$W\left(R_{zxz}\left(\pi(x_{N_1,i}+1), \frac{\pi}{2}(x_{N_2,j}+1), \pi(x_{N_3,k}+1)\right) \cdot (x-y)\right)$$

$$\sin\left(\frac{\pi}{2}(x_{N_2,j}+1)\right).$$

By selecting the set of group-equivariant transformations 508 as follows:

$$g_{ijk} = R_{zxz}\left(\pi(x_{N_1,i}+1), \frac{\pi}{2}(x_{N_2,j}+1), \pi(x_{N_3,k}+1)\right)$$

and by selecting the set of contributing weights 510 as follows:

$$s_{ijk} = \frac{\pi}{16} w_{N_1,i} w_{N_2,j} w_{N_3,k} \sin\left(\frac{\pi}{2}(x_{N_2,j}+1)\right),$$

then $W^G(x-y)$ can be approximated as given in Eq. (8) and the convolution $[W *^G F]$ in Eq. (1) can be approximated as given in the above Eq. (9). That means, the approximation given in Eq. (5) can be reduced to a form given in Eq. (9).

Figure 6:
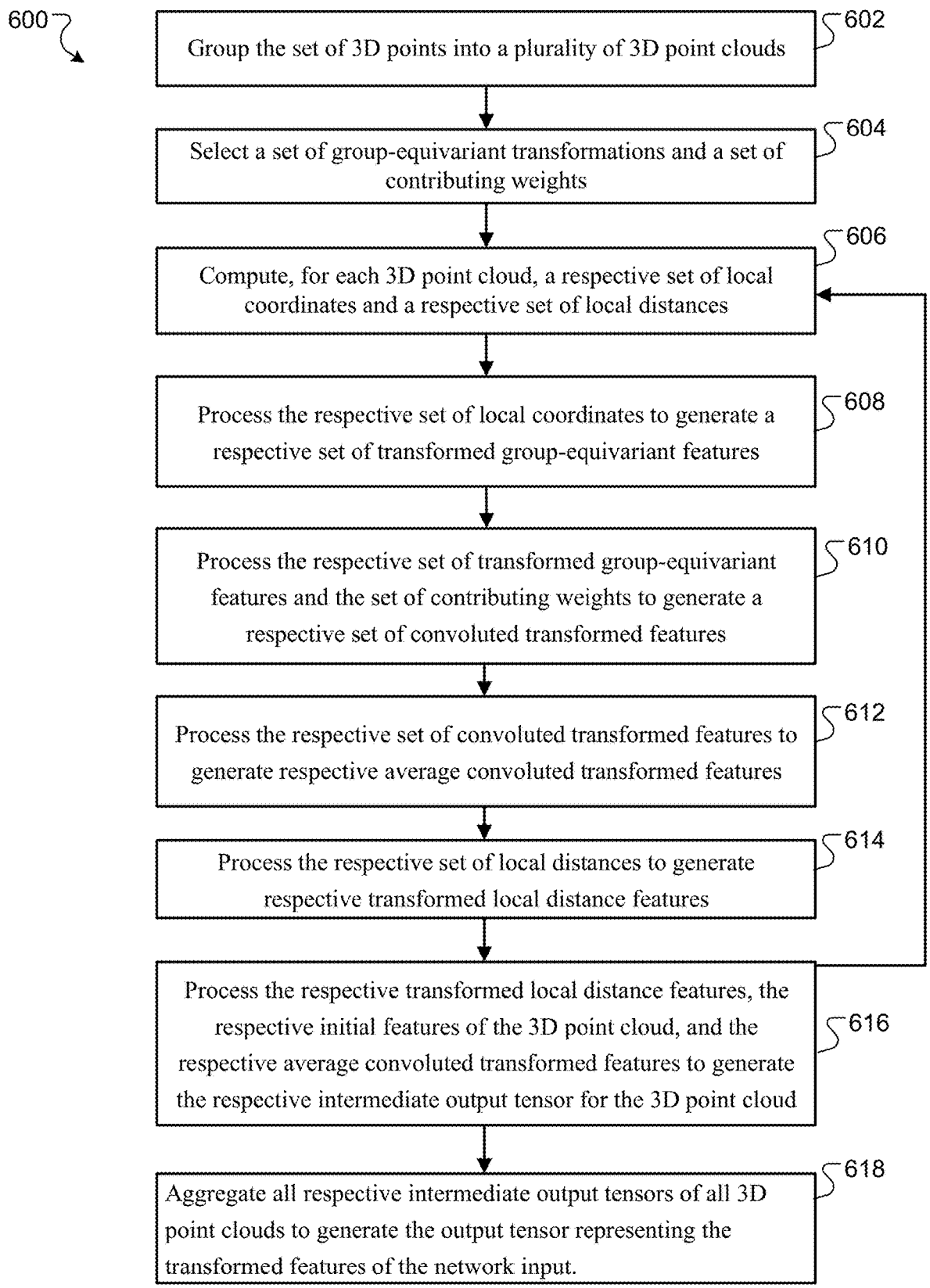
FIG. 6 is a flow diagram of an example process for processing a network input including a set of 3D points to generate an output tensor representing transformed features of the network input.

FIG. 6 is a flow diagram of an example process 600 for processing a network input including a set of 3D point clouds to generate an output tensor representing transformed features of the network input. For convenience, the process 600 will be described as being performed by a system of one or more computers located in one or more locations. For example, a neural network system, e.g., the neural network system 100 of FIG. 1, appropriately programmed in accordance with this specification, can perform the process 600. The network input including the set of 3D point clouds that represent one or more real-life objects in an environment.

The system groups the set of 3D points into a plurality of 3D point clouds (step 602). Each 3D point cloud having a respective centroid. Each 3D point of the set of 3D points belongs to one or more 3D point clouds, and each 3D point cloud has a set of initial features.

The system selects a set of group-equivariant transformations and a set of contributing weights (step 604). The set of group-equivariant transformations may include one or more of translation, permutation, rotation, reflection, scale, or any combination thereof. In some implementations, the set of group-equivariant transformations represents a finite set of transformations. In some other implementations, the set of group-equivariant transformations represents an infinite set of rotations. In some implementations, each of contributing weight in the set of contributing weights is one.

The process for selecting the set of group-equivariant transformations and the set of contributing weights is described in detail above with reference to FIG. 2, FIG. 3, FIG. 4, and FIG. 5.

The system computes, for each 3D point cloud, a respective set of local coordinates with respect the respective centroid and a respective set of local distances to the respective centroid (step 606).

The system processes the respective set of local coordinates to generate a respective set of transformed group-equivariant features by applying the set of group-equivariant transformations on each local coordinate in the respective set of local coordinates (step 608).

The system processes the respective set of transformed group-equivariant features and the set of contributing weights to generate a respective set of convoluted transformed features (step 610).

The system processes the respective set of convoluted transformed features to generate respective average convoluted transformed features (step 612).

The system processes the respective set of local distances to generate respective transformed local distance features (step 614).

The system processes the respective transformed local distance features, the set of initial features of the 3D point cloud, and the respective average convoluted transformed features to generate the respective intermediate output tensor for the 3D point cloud (step 616).

In particular, the system multiplies the respective transformed local distance features with the set of initial features of the 3D point cloud to generate a first respective temporary tensor for the 3D point cloud. The system then multiplies the first respective temporary tensor with the respective average convoluted transformed features to generate the respective intermediate tensor for the 3D point cloud.

The system aggregates all respective intermediate output tensors of all 3D point clouds to generate the output tensor representing the transformed features of the network input (step 618). For example, the system can concatenate all respective intermediate output tensors of all 3D point clouds to generate the output tensor.

In some implementations, the system may use the output tensor to perform a machine learning task. In some other implementations, the system may provide the output tensor to another system that uses the output tensor to perform a machine learning task. The machine learning task can be, for example, a image classification task or a semantic segmentation task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that, when executed by the one or more computers, cause the one or more computers to implement a neural network configured to process a network input including a set of 3D points to generate an output tensor representing transformed features of the network input, the neural network comprising:
   a grouping layer configured to group the set of 3D points into a plurality of 3D point clouds, each 3D point cloud having a respective centroid, wherein each 3D point in the set of 3D points belongs to one or more 3D point clouds, and each 3D point cloud has a set of initial features;
   a switching layer configured to select a set of group-equivariant transformations and a set of contributing weights;
   a pre-processing layer configured to compute, for each 3D point cloud, a respective set of local coordinates with respect the respective centroid and a respective set of local distances to the respective centroid;
   a group-equivariant layer configured to process the respective set of local coordinates to generate a respective set of transformed group-equivariant features by applying the set of group-equivariant transformations on each local coordinate in the respective set of local coordinates;
   a first subnetwork configured to process the respective set of transformed group-equivariant features and the set of contributing weights to generate a respective set of convoluted transformed features;
   an average pooling layer configured to process the respective set of convoluted transformed features to generate respective average convoluted transformed features;
   a second subnetwork configured to process the respective set of local distances to generate respective transformed local distance features;
   an output subnetwork configured to process the respective transformed local distance features, the set of initial features of the 3D point cloud, and the respective average convoluted transformed features to generate the respective intermediate output tensor for the 3D point cloud; and
   a final output layer configured to aggregate all respective intermediate output tensors of all 3D point clouds to generate the output tensor representing the transformed features of the network input.

2. The system of claim 1, wherein the set of 3D points represents one or more real-life objects in an environment.

3. The system of claim 2, wherein the one or more real-life objects include one or more of a vehicle, a human, a tree, a traffic light, a pavement, an airplane, a table, a chair, a sofa, or a computer.

4. The system of claim 1, wherein initial features of a 3D point includes 3D coordinates and RGB colors of the 3D point.

5. The system of claim 1, wherein the set of group-equivariant transformations represents a finite set of transformations.

6. The system of claim 5, wherein the set of group-equivariant transformations includes one or more of translation, permutation, rotation, reflection, scale, or any combination thereof.

7. The system of claim 5, wherein each of contributing weight in the set of contributing weights is one.

8. The system of claim 1, wherein the set of group-equivariant transformations represents an infinite set of rotations.

9. The system of claim 1, wherein the first subnetwork is a first multi-layer convolutional subnetwork.

10. The system of claim 9, wherein the first multi-layer convolutional subnetwork is WeightNet.

11. The system of claim 1, wherein the second subnetwork is a second multi-layer convolutional subnetwork.

12. The system of claim 10, wherein the second multi-layer convolutional subnetwork is DensityNet.

13. The system of claim 1, wherein the output subnetwork comprises:
- a first multiplication layer configured to multiply the respective transformed local distance features with the set of initial features of the 3D point cloud to generate a first respective temporary tensor for the 3D point cloud; and
- a convolutional layer configured to multiply the first respective temporary tensor with the respective average convoluted transformed features to generate the respective intermediate tensor for the 3D point cloud.

14. The system of claim 13, wherein the convolutional layer is a 1×1 convolutional layer.

15. The system of claim 1, wherein the output tensor is used to perform a machine learning task.

16. The system of claim 15, wherein the machine learning task is an image classification task or a sematic segmentation task.

17. The system of claim 15, wherein the neural network has a plurality of network parameters that are determined by training the neural network to perform the machine learning task.

18. The system of claim 1, wherein the neural network is configured to process the network input to generate the output tensor by using a Monte Carlo approximation of a continuous group-equivariant convolution mapping.

19. A computer-implemented method for processing a network input including a set of 3D points to generate an output tensor representing transformed features of the network input, the method comprising:
- grouping the set of 3D points into a plurality of 3D point clouds, each 3D point cloud having a respective centroid, wherein each 3D point of the set of 3D points belongs to one or more 3D point clouds, and each 3D point cloud has a set of initial features;
- selecting a set of group-equivariant transformations and a set of contributing weights;
- computing, for each 3D point cloud, a respective set of local coordinates with respect the respective centroid and a respective set of local distances to the respective centroid;
- processing the respective set of local coordinates to generate a respective set of transformed group-equivariant features by applying the set of group-equivariant transformations on each local coordinate in the respective set of local coordinates;
- process the respective set of transformed group-equivariant features and the set of contributing weights to generate a respective set of convoluted transformed features;
- processing the respective set of convoluted transformed features to generate respective average convoluted transformed features;
- processing the respective set of local distances to generate respective transformed local distance features;
- processing the respective transformed local distance features, the respective initial features of the 3D point cloud, and the respective average convoluted transformed features to generate the respective intermediate output tensor for the 3D point cloud; and
- aggregating all respective intermediate output tensors of all 3D point clouds to generate the output tensor representing the transformed features of the network input.

20. One or more non-transitory computer storage media storing instructions that when executed by one or more computers cause the one or more computers to perform operations comprising:
- grouping the set of 3D points into a plurality of 3D point clouds, each 3D point cloud having a respective centroid, wherein each 3D point of the set of 3D points belongs to one or more 3D point clouds, and each 3D point cloud has a set of initial features;
- selecting a set of group-equivariant transformations and a set of contributing weights;
- computing, for each 3D point cloud, a respective set of local coordinates with respect the respective centroid and a respective set of local distances to the respective centroid;
- processing the respective set of local coordinates to generate a respective set of transformed group-equivariant features by applying the set of group-equivariant transformations on each local coordinate in the respective set of local coordinates;
- process the respective set of transformed group-equivariant features and the set of contributing weights to generate a respective set of convoluted transformed features;
- processing the respective set of convoluted transformed features to generate respective average convoluted transformed features;
- processing the respective set of local distances to generate respective transformed local distance features;
- processing the respective transformed local distance features, the respective initial features of the 3D point cloud, and the respective average convoluted transformed features to generate the respective intermediate output tensor for the 3D point cloud; and
- aggregating all respective intermediate output tensors of all 3D point clouds to generate the output tensor representing the transformed features of the network input.

* * * * *